Figure 1:
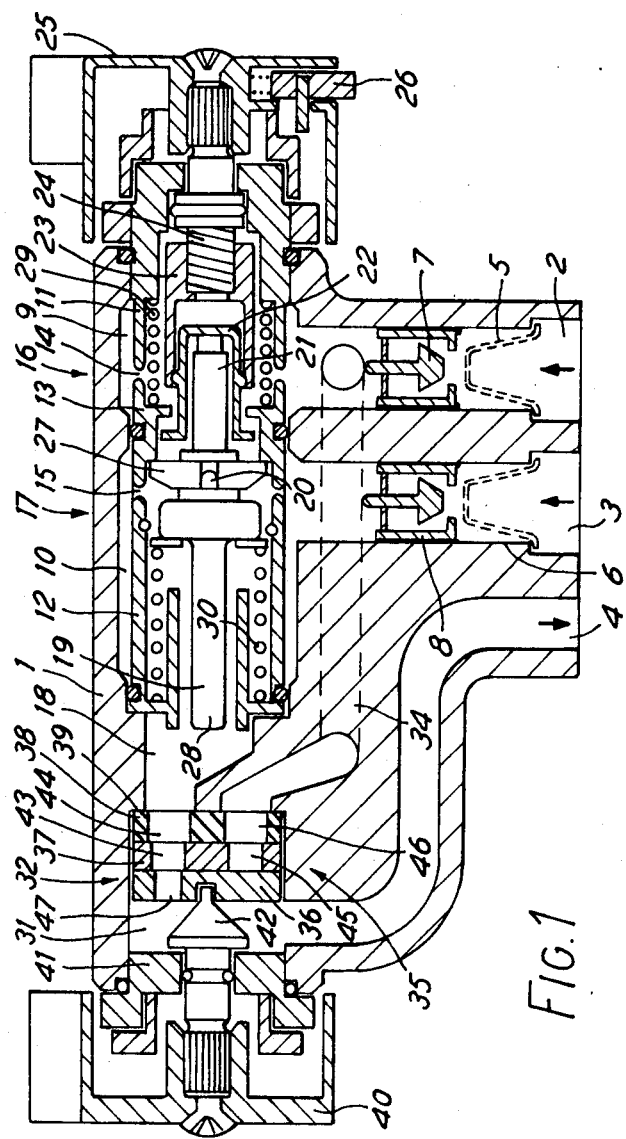

United States Patent [19]

Avelöv

[11] Patent Number: 4,669,653
[45] Date of Patent: Jun. 2, 1987

[54] THERMOSTATIC MIXER TAP

[75] Inventor: Rolf I. Avelöv, Mjölby, Sweden

[73] Assignee: Danfoss A/S, Nordborg, Denmark

[21] Appl. No.: 817,139

[22] Filed: Jan. 8, 1986

[30] Foreign Application Priority Data

Jan. 9, 1985 [DE] Fed. Rep. of Germany ....... 3500461

[51] Int. Cl.⁴ ............................................. G05D 23/12
[52] U.S. Cl. .............................. 236/12.13; 137/625.41
[58] Field of Search ................. 236/12.13, 12.1, 12.16; 137/625.41

[56] References Cited

U.S. PATENT DOCUMENTS

| | | | |
|---|---|---|---|
| 1,741,735 | 12/1929 | Powers | 137/625.41 |
| 2,091,110 | 8/1937 | Smallen | 137/625.41 X |
| 2,296,266 | 9/1942 | Breckenridge | 236/12.13 |

Primary Examiner—William E. Wayner
Attorney, Agent, or Firm—Wayne B. Easton; Clayton R. Johnson

[57] ABSTRACT

The invention relates to a thermostatic type of mixer tap having hot and cold water inlets and outlets for discharging water at an intermediate temperature controlled by a thermostatic valve unit. The mixer tap has a mixing chamber to which apportioned amounts of hot and cold water are admitted by the thermostatic valve unit and outlet valve for controlling the flow from the mixing chamber to the outlet. For drinking purposes there is provided a bypass conduit which extends from the cold water inlet to the outlet valve which bypasses the mixing chamber. The outlet valve is operable to selectively connect either the mixing chamber or the bypass conduit to the outlet as desired.

9 Claims, 6 Drawing Figures

THERMOSTATIC MIXER TAP

The invention relates to a thermostatic mixer tap comprising a mixing chamber connected to a cold water supply and a hot water supply by a respective thermostatically actuated valve and to an outlet by way of a mixed water valve having positions for blocking and for quantity settings.

In a known mixer tap of this kind (DE-AS 12 98 944), the mixing chamber communicates by way of a respective mixed water valve with a bath outlet and a shower outlet. The two thermostatically actuated valves are intercoupled and assume such a position that the mixed water temperature in the mixing chamber can be said to be the same as a desired value set by means of a rotary knob. The outflowing quantity of mixed water is determined by the respective mixed water valve. However, difficulties arise if very cold water is required e.g. for drinking purposes. Experience has shown that with such mixer taps having a desired value setting one cannot reduce the temperature of the water down to the temperature of the cold water supply.

Further, a mixer is known (DE-AS 12 91 960), in which the hot water supply and the cold water supply are connected to the common outlet by way of a first switching valve and a second switching valve, respectively. These switching valves, are opened electromagnetically by a push button switch. In this case, cold water will flow to the outlet by operating the cold water switching valve alone.

The invention is based on the problem of providing a thermostatic mixer tap of the aforementioned kind that is also able to deliver cold water.

This problem is solved according to the invention in that the cold water supply is connected direct to the outlet by way of a cold water conduit having a cold water valve and that the cold water valve and the mixed water valve are so intercoupled that the cold water valve can be opened only in one blocking position of the mixed water valve.

Since the cold water conduit bypasses the mixing chamber, the outlet can be supplied with cold water at the mains temperature. By reason of the operative coupling of the cold water valve and mixed water valve, one ensures that the desired effect is not detrimentally influenced by the fact that the cold water has mixed water from the mixing chamber added to it. Another advantage resides in the fact that the cold water valve can also serve to set the quantity and it is therefore possible to withdraw a desired quantity of not only mixed water but also cold water.

It is particularly favourable if the mixed water valve and the cold water valve comprise a common operating element. This results in a particularly simple construction. In addition, one practically eliminates the danger of wrong operation.

In a preferred embodiment, the mixed water valve and the cold water valve comprise a common rotary valve which, in a first rotary zone, connects the mixing chamber to the outlet and blocks the cold water conduit, in a second rotary zone connects the cold water conduit to the outlet and blocks the mixing chamber outlet and, in intermediate third rotary zone, blocks the mixing chamber inlet as well as the cold water conduit. All the functions of the mixed water valve and the cold water valve can be fulfilled with the aid of the common rotary valve.

In particular, the rotary valve can comprise a control orifice which can be brought into communication on the inlet side with a stationary mixed water orifice and a stationary cold water orifice and on the outlet side communicates with the outlet. This results in a particularly simple construction for the rotary valve arrangement.

In one embodiment, the rotary valve is a flat valve having a control orifice in the form of an aperture, the mixed water orifice and the cold water orifice being disposed in one plane. With the aid of such a flat valve, one can achieve particularly small constructions.

Advantageously, the mixed water orifice and the cold water orifice are in the form of apertures in a flat disc which, with the interpositioning of an elastic sealing disc, is adjacent to analogous apertures of a housing surface into which the mixing chamber outlet and the cold water conduit open, the flat valve being axially loaded. In this way, the sealing disc is elastically compressed so that on the one hand one obtains a good seal and on the other hand there is a return force which sealingly hold the flat valve and flat disc together.

In an alternative embodiment, the rotary valve is a sleeve, the control orifice is formed by an aperture in the sleeve wall, the mixed water orifice and the cold water orifice are disposed at the inner surface of a housing bore receiving the sleeve, and the interior of the sleeve communicates with the outlet. This embodiment likewise leads to a simple construction.

In particular, the peripheral surfaces of the sleeve and bore can be conical. If the sleeve is loaded axially, one obtains a good seal.

In a further embodiment, the mixed water valve and the cold water valve each comprise a closure member which co-operates with a seating and is carried by an axially adjustable valve stem, wherein the common operating element adjusts a curved surface against which the valve stems are resiliently held and which opens either the one or the other valve or blocks both. In this case, both valves can be identical.

In particular, both valve stems can be in parallel to both sides of the rotary shaft of the common operating element and the latter may carry the curved surface. This leads to a compact construction.

Figure 2:
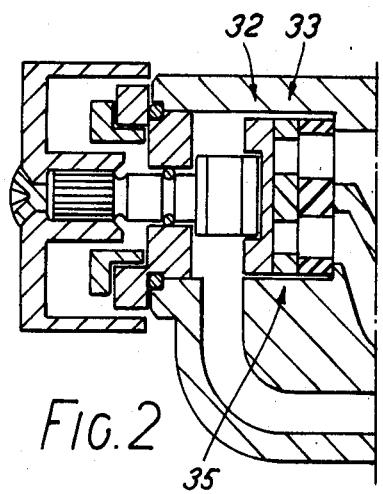
Figure 3:
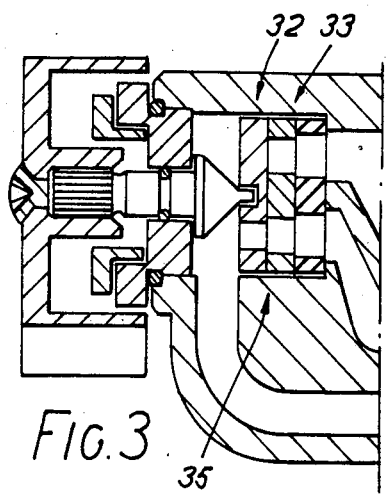
Figure 4:
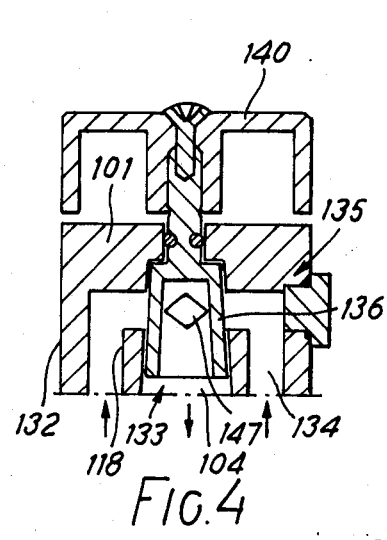

Preferred examples of the invention will now be described in more detail with reference to the drawing, wherein:

FIG. 1 is a longitudinal section through a mixer tap according to the invention, the mixed water valve in a valve combination being open, FIG. 2 shows the valve combination of FIG. 1 in a blocking position, FIG. 3 shows the FIG. 1 valve combination in the open position of the cold water valve, FIG. 4 is a longitudinal section through a second embodiment of a valve combination usable for a mixer tap.

Figure 5:
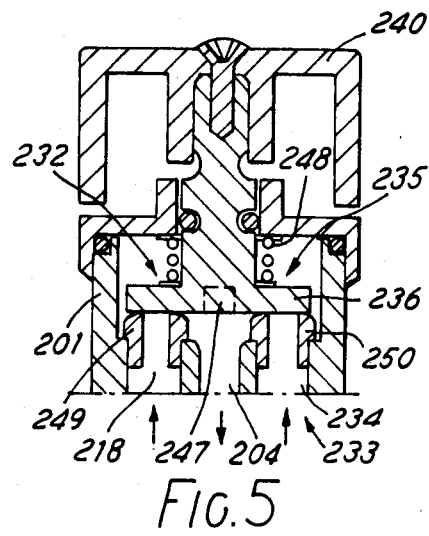
Figure 6:
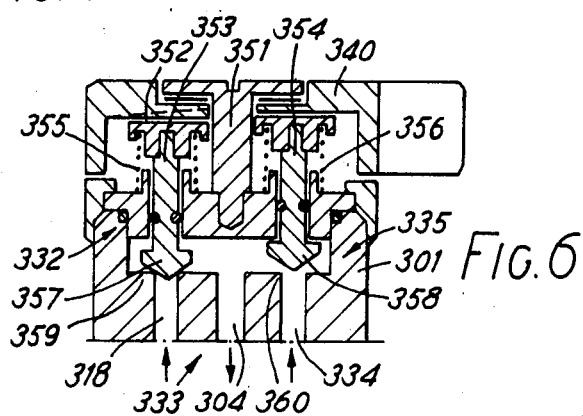

FIG. 5 is a longitudinal section through a third embodiment of a valve combination and FIG. 6 is a longitudinal section through a fourth embodiment of a valve combination.

The thermostatic mixer tap of FIGS. 1 to 3 comprises a housing 1 with a cold water supply 2, a hot water supply 3 and an outlet 4. A screen 5, 6 and a check valve 7, 8 are disposed in each of the supplies 2 and 3. The cold water supply opens into an annular chamber 9 and the hot water supply into an annular chamber 10. The annular chambers are bounded by two sleeves 11 and 12 fixed in the housing 1 and by a regulating piston 13. The remaining annular gaps 14 and 15 form two intercoupled thermostatic valves 16 and 17 for the cold water and hot water. In this way, mixed water consisting of both components is obtained in a mixing chamber 18.

For thermostatically regulating the mixed water, there is a solid operating element 19 in the form of a wax cartridge of which the servo-piston 21 is supported against a sleeve 23 by way of an intermediate member 22, the sleeve being axially displaceable with the aid of a screwthread 24. The screwthread is adjustable with the aid of a rotary knob which is provided in the conventional manner with a safety knob 26 to prevent the unintentional setting of elevated temperatures. A pressure shoe 20 is positively connected to the cylinder 28 of the solid operating element. It acts on the regulating piston 13 by way of radial fingers 27, the piston being in turn supported by a spring 29. The cylinder 28 is supported by an overpressure spring 30.

The mixing chamber 18 can be brought into communication with an inlet chamber 31 of the outlet 4 by way of the mixed water valve 32 of a valve combination 33, as is shown in FIG. 1. In addition, there is a cold water conduit 34 which is connected from the cold water supply 2 by way of the cold water valve 35 of the valve combination 33 to the inlet chamber 31. The valve combination comprises a rotary valve 36 in the form of a flat valve which lies against a flat disc 37 which is held fixed with respect to the housing and which is in turn supported by way of an elastic sealing disc 38 against a housing surface 39 into which the mixing chamber outlet and the cold water conduit 34 open. The rotary valve 36 can be turned with the aid of a rotary handle 40. By means of an insert 41, an entrainment member 42 of the rotary handle that engages in a groove of the rotary valve is so loaded axially that the elastic sealing disc 38 is compressed. The mixed water valve comprises two corresponding apertures 43 and 44 in the flat disc 37 and the sealing disc 38 and the cold water valve comprises corresponding apertures 45 and 46 in these two parts. The rotary valve comprises a control orifice which can be selectively brought into communication with the mixed water orifice of the aperture 43 (FIG. 1) or with the cold water orifice of the aperture 45 (FIG. 3) or is blocked by the flat disc 37 (FIG. 2). In intermediate positions, the orifices 43 or 45 are only partially freed by the control orifice 47 to result in a quantity setting for the mixed water and for the cold water.

In FIG. 4, corresponding reference numerals are used but increased by 100. In this case, the mixed water valve 133 and the cold water valve 135 are combined to form a valve combination 133 in which the common rotary handle 140 actuates a rotary valve 136 in the form of a sleeve. The peripheral wall of the latter comprises a control orifice 147 which is adapted to co-operate with the mouths of the mixing chamber 118 and cold water conduit 134 in a bore of the housing 101. The control orifice 147 is illustrated in the blocked position.

In the FIG. 5 embodiment, reference numerals are employed which are increased by 200 in comparison with FIGS. 1 to 3. A rotary valve 236 in the form of a flat valve is connected to the handle 240 and so loaded by a spring 248 that they are pressed against the seating 249 of the mixing chamber 218 or 250 of the cold water conduit 234 . The control orifice 247 communicating with the outlet 204 is shown in the blocked position.

In the FIG. 6 embodiment, reference numerals are employed that are increased by 300 in comparison with FIGS. 1 to 3. The rotary handle 340 can be turned about a shaft 351. At its inner end, it has a curved surface 352. On both sides of the shaft 351, there are axially adjustable stems 353 and 354 of the mixing valve 333 and the cold water valve 335. These are each held by their end face against the curved surface 352 by means of a spring 355 or 356. They carry a closure member 357 or 358 adapted to co-operate with a valve seating 359 associated with the mixed water conduit 318 or a valve seating 360 associated with the cold water conduit 334. The drawing shows the cold water valve 335 fully open.

Instead of the illustrated thermostatic valves 16 and 17, one can also use those with a valve seat and closing member. The operating element 19 can also be replaced by an operating element having a liquid/vapour filling and desired value spring.

I claim:

1. A thermostatic type mixer tap, comprising, a housing that includes a mixing chamber having an outlet, a hot water inlet conduit having an inlet end and an outlet portion, a cold water inlet conduit having an inlet end and an outlet portion, an outlet conduit having an inlet end portion and an outlet, and a bypass conduit having an inlet opening to the cold water conduit between the cold water conduit inlet end and the cold water outlet portion and an outlet, thermostatic controlled valve means for apportioning flow of hot water and cold water from the hot and cold water outlet portions to the mixing chamber, outlet valve means operable between a first condition blocking flow of water from both of the bypass conduit outlet to the outlet conduit inlet end portion and the mixing chamber outlet to the outlet conduit inlet end portion, a second condition blocking flow of water from the bypass conduit outlet to the outlet conduit inlet end portion and permitting flow of water from the mixing chamber outlet to the outlet conduit inlet end portion, and a third condition permitting the flow of water from the bypass conduit outlet to the outlet conduit inlet end portion and blocking the flow of water from the mixing chamber outlet to the outlet conduit inlet end portion, and a handle rotatably relative the housing and associated with the outlet valve means for selectively operating the outlet valve means to the desired one of the first, second and third conditions.

2. A mixer tap according to claim 1, characterized, in that the handle is mounted for rotation by one of the outlet valve means and the housing.

3. A mixer tap according to claim 2, characterized in that the outlet valve means includes a first closure member resiliently retained in abutting relationship to the handle and movable by rotation of the handle between a position permitting flow of water out of the mixing chamber outlet and a position blocking flow out of the mixing chamber outlet, and a second closure member resiliently retained in abutting relationship to the handle and movable by rotation of the handle between a position permitting flow of water out of the bypass conduit outlet and a position blocking flow of water out of the bypass conduit outlet and that the handle is mounted on the housing for rotation between three positions and has a curved surface abutting against the first and second closure members to in the handle first position retain both closure members in their flow of water blocking positions, in the handle second position retain the first closure member in its blocking position and permitting the second closure member moving to its position permitting the flow of water, and in the handle third position permit the first closure member moving to its position permitting the flow of water and retaining the second closure member in its blocking position.

4. A mixer tap according to claim 1, characterized in that said outlet valve means has a single operating element that is movable between the outlet valve means first, second and third conditions for controlling flow of water to the outlet conduit.

5. A mixer tap according to claim 4, characterized in that the operating element comprises a flat valve having a control orifice in the form of an aperture opening to the outlet conduit inlet portion, that the outlet valve means includes a flat disc having a first aperture opening to the mixing chamber outlet and a second aperture opening to the bypass conduit outlet in the same plane that the first aperture opens to the mixing chamber, and that the handle is rotatable relative to the housing and when it has been rotated to the outlet valve means second and third conditions the handle moves the flat valve to positions to have the flat valve aperture open only to the flat disc first and second apertures respectively.

6. A mixer tap according to claim 4, characterized in that the handle is rotatable relative to the housing, that the operating element comprises a sleeve member having an interior that is in constant fluid communication with the outlet conduit means and a control aperture that places the sleeve interior in fluid communication with the mixing chamber and the cold water inlet conduit outlets when the handle has been rotated to move the outlet valve means to the outlet valve means second and third conditions respectively, and when in its first position blocks water flow from both the cold water inlet conduit and the mixing chamber to the sleeve interior.

7. A thermostatic type mixer tap, comprising, a housing that includes a mixing chamber having an outlet, an inlet chamber having an outlet, a hot water inlet conduit having an inlet end and an outlet portion, a cold water inlet conduit having an inlet end and an outlet portion, an outlet conduit having an inlet opening to the inlet chamber and an outlet end, and a bypass conduit having an inlet opening to the cold water conduit between the cold water conduit inlet and outlet end, thermostatic controlled valve means for apportioning the flow of hot water and cold water from the respective hot and cold water outlet portions to the mixing chamber, outlet valve means mounted by the housing for rotation between a first position blocking flow of water from both the bypass conduit outlet end and the mixing chamber outlet to the inlet chamber, a second position blocking flow of water from the bypass conduit outlet end to the inlet chamber and permitting flow of water from the mixing chamber outlet to the inlet chamber, and a third position permitting the flow of water from the bypass conduit outlet end to the inlet chamber and blocking water flow from the mixing chamber outlet to the inlet chamber and handle means on the housing for selectively rotating the outlet valve means between it positions.

8. A mixer tap according to claim 7, characterized that the outlet valve means includes a flat disc having a first aperture opening to the mixing chamber outlet and a second aperture opening to the bypass conduit outlet and a flat valve having a first and a second aperture opening to the inlet chamber, mounted in abutting relationship to the flat disc and rotatable by the handle means between the outlet valve means three positions, the flat valve in the outlet valve means first position having its aperture out of alignment with both the first and second apertures of the flat disc to block water flow through both of the disc apertures to the inlet chamber.

9. A mixture tap according to claim 8, characterized in that the outlet valve means includes a sealing disc mounted by the housing and has a first aperture through which the flat disc first aperture opens to the mixing chamber outlet and a second aperture through which the flat disc second aperture opens to the bypass conduit outlet.

* * * * *